Nov. 5, 1946.  J. J. GARUBO  2,410,410
STORAGE AND DISPENSING DEVICE
Filed April 2, 1943  2 Sheets-Sheet 1

INVENTOR.
JOSEPH J. GARUBO.
BY John H. Leonard,
ATTORNEY

Nov. 5, 1946.  J. J. GARUBO  2,410,410
STORAGE AND DISPENSING DEVICE
Filed April 2, 1943  2 Sheets-Sheet 2

INVENTOR.
JOSEPH J. GARUBO.
BY
ATTORNEY

Patented Nov. 5, 1946

2,410,410

UNITED STATES PATENT OFFICE 2,410,410

STORAGE AND DISPENSING DEVICE

Joseph J. Garubo, Detroit, Mich.

Application April 2, 1943, Serial No. 481,525

4 Claims. (Cl. 222—185)

This invention relates to a storage and dispensing device particularly for foods in granular form such as coffee, cereals, desiccated fruits, vegetables and the like which are apt to deteriorate, either through evaporation or absorption of moisture or volatile matter and/or which may be subject to deterioration due to changes in temperature, for example, freezing, overheating, or the like.

An object is to provide a simple and effective protective container for food products having a hopper arrangement and dispensing valve whereby suitable quantities of the stored food products can easily be removed from the storage space of the device under accurate control by the user.

Another object is to provide a dispensing container for granular products, wherein a dispensing valve, in being operated to opened and closed position in respect to the container space, effects agitation of granular contents of the storage space.

Still another object is to provide a novel and effective insulated wall construction for a food container and dispenser, wherein low density insulation material is used and is prevented from becoming partially ineffective due to settling and resulting effective shrinkage or dislocation.

Still another object is to provide a protective dispensing container for granular food products provided with a hollow base for removably supporting a receiving receptacle and wherein the parts are so arranged that the receptacle can be viewed easily to determine when it has received the desired quantity and also to ascertain whether or not the receptacle is in proper position to receive the dispensed products.

Still another object is to provide a viewing window for a dispensing container for foods which container has heat insulating walls.

Further objects hereof include provision of a valve means for a dispensing container for granular foods and the like which means can be operated to hold the valve open as long as necessary without requiring special attention by the user but which, upon the application of, for instance, a slight releasing force by the user, then returns the valve to closed position; which valve and operating means, also is very compact, particularly in a vertical direction, easy to assemble and not likely to get out of order.

A further object is to provide an insulated wall closure arrangement and sealing means for a dispensing container of the type discussed above and which can easily be applied to and removed from the main receptacle space of the container.

Other objects and features of the invention will become apparent from the following specification, wherein reference is made to the drawings, in which Fig. 1 is a sectional side elevational view of the device in one form, certain of the parts being shown in central vertical section at the left and lower part of the view;

While the device is shown as though made largely from sheet metal, it is to be understood that any other material may be used in its construction, examples being plastics in the generally accepted sense or glass.

Figures 1, 2, 3, 4:
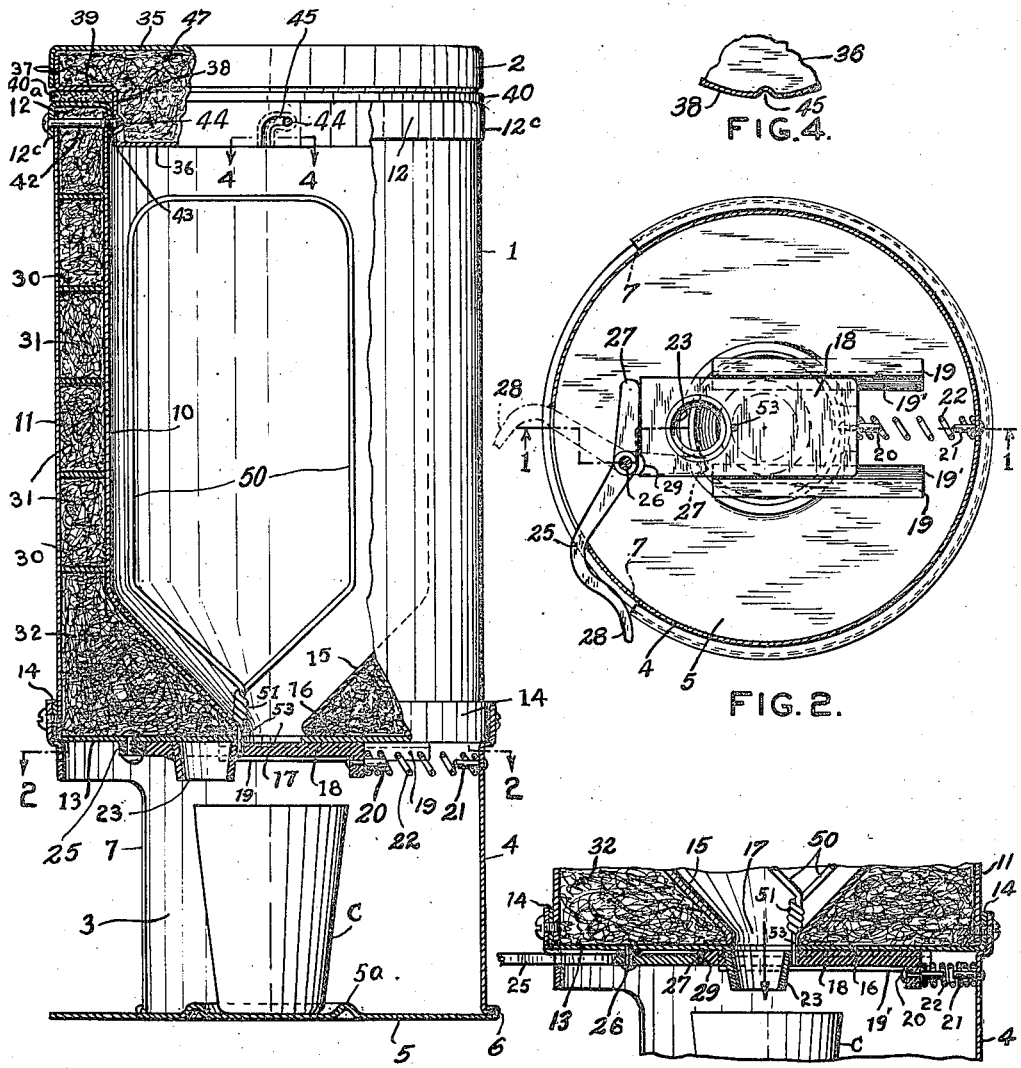
Fig. 2 is a sectional plan view as indicated by the line 2—2 on Fig. 1 and showing particularly a dispensing valve and operating means therefor.
Fig. 3 is a sectional view similar to Fig. 1 showing the dispensing valve in dispensing position.
Fig. 4 is a detail sectional view of the cover attaching and releasing means as indicated by the line 4—4 on Fig. 1.

Fig. 1 shows the storage container 1 provided with a top opening and a detachable cover 2. The container 1 is supported on a hollow base 3 preferably constituted by a shell-like vertical wall member 4 and a bottom member 5 of generally flat form to which the lower edges of the member 4 are secured as by a suitable joint indicated at 6. The base plate 5 forms a support on which a receiving receptacle, such as a measuring glass C or a cup, can be placed in position directly below the discharge portion of the container 1. The base shell is open at the front toward the user, being cut away approximately as indicated by the edges 7, Figs. 1 and 2, to enable such receptacle or cup C to be easily and accurately placed in proper receiving position. The proper position on the base member 5 for the receptacle C can be indicated by a central area on the base member of contrasting appearance or by an annular rib as at 5a on the base member.

The storage container may be formed as by an inner peripherally continuous wall member 10, a similar outer peripherally continuous wall member 11, a top connecting piece 12 of annular form and channel-shaped cross section, and a bottom wall 13. The bottom wall is rigidly connected to the outer wall 11 as at the flange 14 of the bottom and similarly or suitably connected to the lower end of a downwardly converging funnel or hopper-constituting portion 15 of the inner wall as at a continuous flange 16 of the portion 15. The converging wall portion 15 of the inner wall member 10 provides a discharge opening 17 preferably of circular form. The dispensing valve comprises, as shown, a rectangular plate 18 in a guideway formed as by a pair of sheet metal members 19 or Z-bar section attached to the bottom wall 13 and having valve-plate-supporting flanges 19'.

The valve plate 18 is maintained by the guideway in close sliding contact with the bottom wall 13 around the opening 17 so as to effect a moisture seal as well as a retaining support for the granular material in the container 1.

Cooperating with the discharge opening 17 of the hopper and carried on the valve plate 18, is a tube 23 which, in the valve opening position of the valve plate, is vertically aligned with the discharge opening 17.

In order normally to urge the valve plate 18 into container-sealing position, the plate is provided at its rear edge with a horizontal pin 20 and a rear portion of the wall 4 is provided with a pin 21 in alignment with the pin 20, over which is placed a coiled compression spring 22. The compression spring 22 is of such length as to be self retaining on the pins 20 and 21 and acts against the plate 18 to move the latter forwardly from the valve opening or dispensing position, Fig. 3, to the valve closing position shown in Fig. 1.

In order to move the valve plate 18 to dispensing position, and temporarily retain it if desired, there is provided an operating lever 25 supported adjacent the lower side of the wall 13 as on pivot pin 26 depending from said wall 13 in the position indicated especially in Fig. 2. The inner end 27 of the lever is rounded to constitute an operating nose or cam so positioned in respect to the pivot 26 that the nose slides against the front edge of the valve plate (upon clockwise turning of the lever as shown in Fig. 2) forcing the plate to the right or rearwardly. The lever has an operating arm portion 28 extending outwardly from beneath the container and which, in the closed position of the valve, preferably lies close to the circular side wall 4 and at one side of the front opening in the base as will be clear from Figs. 1 and 2, thus being normally in protected position and generally out of the way of the user in respect to placing the receptacle C in position within the hollow base. When the operating lever 25 has been swung outwardly into the broken line position thereof shown in Fig. 2 then the rounded nose 27 enters a slight depression 29 in the forward edge of the plate 18 to hold the plate in valve opening position without further special attention on part of the user until the proper or desired amount of contents has been dispensed. Then a slight force applied to the lever arm 28 will release the nose 27 from the detent socket 29, whereupon the spring 22 automatically returns the valve to fully closed position.

Referring further to Fig. 1, the space between the upper concentric and parallel portions of the walls 10 and 11 of the storage container 1 as well as the generally circular enlarged space of triangular cross section around the hopper or funnel portion 15 are preferably packed with low density insulation material such as granular cork, spun glass or rock wool. In order to prevent settling and excessive packing of the insulation material, such as would render portions of the insulation body inefficient, annular sheet metal plates 30 are forced into mutually parallel position between the concentric parallel walls 10 and 11. The plates 30 are maintained in position by friction with both the inner and outer walls and confine and retain the separate portions 31 of the insulation material so that one portion 31 cannot tend to pack another portion downwardly. Also the combined weight of the relatively upper portions 31 cannot be imposed upon the portion 32 of the insulation material which lies below the lowermost plate 30.

A heat insulation construction is also provided for the closure cap 2 which preferably comprises generally cup-shaped sheet metal sections, for example, an upper cup-shaped section 35 and lower cup-shaped section 36, said two sections having telescopingly fitted flanged portions 37 secured rigidly together as by a press fit or by solder. The lower section 36 is of reduced diameter at 38 so as to fit inside the wall 10 in closing contact with the inner flange of the channel-shaped closure ring 12. Outwardly adjacent the reduced diameter portion 38 the section 36 has a horizontal annular wall 39 parallel to the web 12a of the channel-shaped member 12. Said web 12a forms a seat for a sealing ring of rubber or other suitable sealing material 40 against which the wall portion 39 of the cover section 36 is caused to be forced by a bayonet lock type securing means for the cover. The whole inside of the cap is filled with insulation material 47 before assembly of the two shells 35 and 36.

Preferably the inner and outer flanges 12b and 12c of the channel-shaped member 12 are connected by a series of pins 42 extending through the flanges and connected to the inner flange as by screw threads 43. The inner ends 44 of the pins are rounded in order to cooperate smoothly with locking sockets 45, preferably formed as indentations of the vertical reduced diameter wall 38 but without perforating said wall (see Fig. 4) to the end that the insulation material 47 inside the cap and retained between the two sections 35 and 36 will not be subjected to moisture or vapor such as may sometimes be desired to be retained in the contents of the container.

As mentioned above, a further feature of the invention is the provision of an agitator operated by the valve plate 18 when the latter is moved to open and closed positions. Such an agitator, shown at 50, may comprise a loop of fairly stiff wire, two end portions of the loop being secured as by a twist 51 in the wire, a "free" end or base portion 53 of the wire projecting below the loop and being retained as by solder in a drilled hole in the valve plate 18 close to the tube 19 of the valve plate and adjacent the discharge opening 17 when the valve plate is in closed position (Fig. 3). Such arrangement of the securing base portion 53 of the wire enables the valve to be substantially completely opened for dispensing purposes as shown by Fig. 3, and fully closed.

The various overlapped flange and joint portions of the construction described above are, of course, secured together by suitable means, for instance, solder or by welding. The hollow base, however, could to advantage be secured to the container structure by readily detachable means for enabling the valve mechanism more readily to be dismounted when necessary for cleaning purposes. In such event the container would be secured to the base as by screws.

Figure 5:
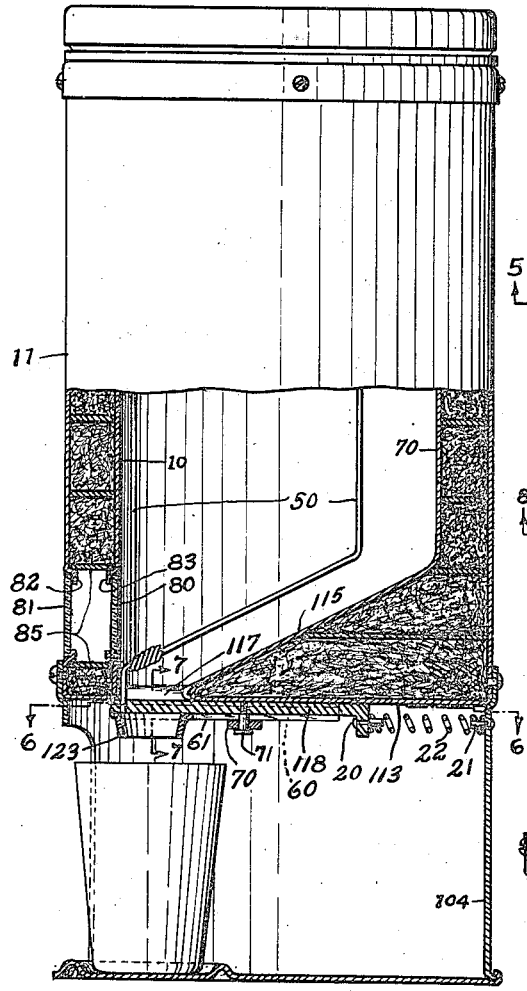
Fig. 5 is a fragmentary view similar to Fig. 1 showing a modified arrangement of hopper and dispensing valve and also an observation window for the purpose of informing the user when the storage container is nearly empty.
Figure 7:
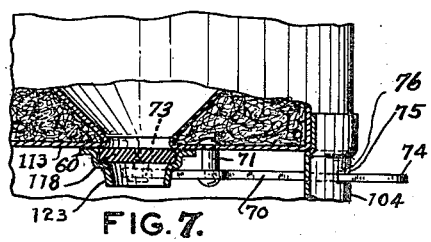
Fig. 7 is a detail sectional view as indicated by the line 7—7 on Fig. 5.

In the form of the invention shown in Fig. 5, the dispensing opening of the storage receptacle is disposed close to the front wall of the device as by making the downwardly converging wall portion 115, which corresponds to the portion 15 of Fig. 1, in gradually increasing eccentric relation to the main upper portion of the inner wall 10. Thus the most eccentric portion of the wall 115 is at the front and provides a discharge opening 117 to close the front opening of the base. The valve plate 118 extends in sliding relationship to the discharge end of the eccentric hopper effect which latter is or may be continued downwardly by a supplemental discharge tube device 123. The device 123 instead of being fastened to the valve plate, as in the case of the tube 23 in the previously described form, is secured to the bottom wall 113 of the storage receptacle. As shown in Fig. 7, the tube 123 may have flange constructions 60 a portion of each side of which is fastened to the wall 113. Said flange constructions 60 may also provide the necessary slideway shoulders at 61 on which the opposite margins of the valve plate 118 are guided. Said shoulders 61 and the flanged constructions 60 would, of course, be continued for a substantial distance rearwardly along the valve plate for adequate support of the valve plate. The valve returning spring and supporting pin arrangement for the spring may be the same as in Figs. 1, 2 and 3, the parts being similarly shown and indicated.

Figure 6:
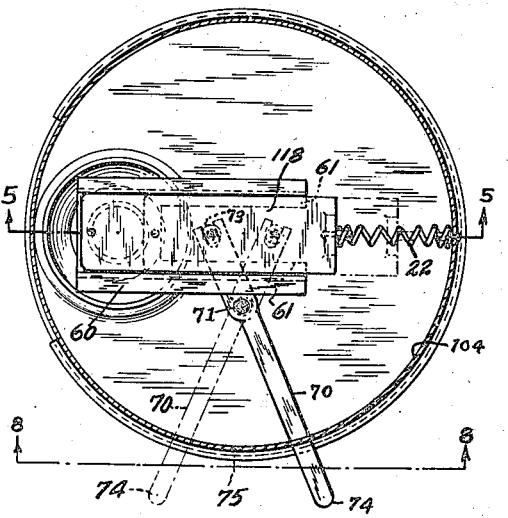
Fig. 6 is a sectional plan view taken substantially along the line 6—6 on Fig. 5 and showing a modified operating means for the dispensing valve.
Figure 8:
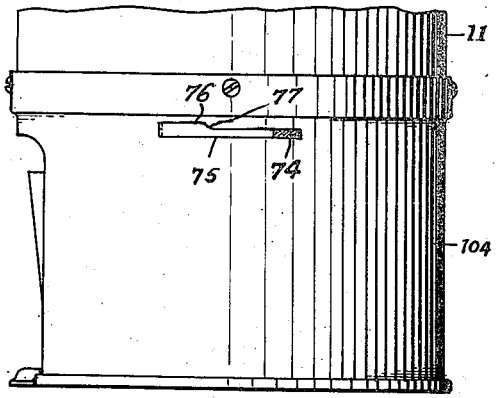
Fig. 8 is a fragmentary detail view of a side wall portion of the device taken as indicated by the line 8—8 on Fig. 6, showing a suitable means for retaining a dispensing valve operating lever in dispensing position.

In order to operate the valve plate 118, a lever 70 is arranged on a suitable fixed pivot 71 attached as to the bottom wall 113, said lever having its inner end provided with a pin and slot connection 73 with the plate so that movement of the lever as from the position thereof shown in full lines in Fig. 6 to the position thereof shown in broken lines will move the valve from closed to opened position. The outer end 74 of the lever extends through a slot 75 in the base shell 104, the shape of the slot being shown in Fig. 8. The outer end of the lever constitutes a leaf spring which is normally stressed in a particular direction, e. g. upwardly, so that with said outer end swung forwardly (left Figs. 6 and 8) said outer end of the lever may enter an indentation 76 of the slot and be retained there against the opposing force of the spring 22 by engagement with an inclined detent shoulder portion 77 adjacent the indented portion 76 of the slot. The detent shoulder 77 slopes in such manner that a slight rearward force on the outer end of the lever by the operator will cause release of the lever, whereupon the spring 22 will automatically close the valve.

An additional feature which may be incorporated into either form of the dispensing container device hereof is an observation window (shown in Fig. 5 only) comprising inner and outer transparent panels 80 and 81, for instance glass, sealed into place in registration with each other as in respective indented oppositely flanged framing sockets 82 and 83 in the inner and outer wall members 10 and 11. The space between the window panels is, of course, kept clear of insulation material, such as mentioned above, as by a suitable inner endless strip 85 continuously surrounding the space between the window panels and maintained in position by shouldered engagement with the frame socket flanges 82 and 83 all around the window aperture.

The window device in the form of the invention shown in Fig. 5 is associated with the lower portion of the hopper effect constituted by the downwardly converging wall 115 at the very front of the storage container, so as to show when the container is practically empty. In the case of the form of the invention shown in Fig. 1, the window could be more readily placed above the hopper effect; and in that position it would still indicate approximately when the container requires refilling.

It will be observed that the small dead air space between the window panels 80 and 81 affords an adequate degree of insulation against transmission of heat to or from the interior of the storage receptacle particularly if the inner framework strip member 85 is sealed to the inner and outer walls of the receptacle all the way around the window aperture as may easily be accomplished.

The agitator (cf. 50 Figs. 1 and 3) while not shown in the arrangement according to Figs. 5 to 8 could be operatively associated with the valve plate 118 in the same way as with the valve plate 18 of the earlier described embodiment.

I claim:

1. A dispensing container for foods of granular form, said container having a top receiving opening for the food and a relatively restricted bottom discharge opening, a hollow base for the container for supporting the bottom thereof above a receiving receptacle, said hollow base being open at one side, a valve plate movably disposed in position to open and close the discharge opening, spring means within the hollow base and operatively bearing against the valve plate and tending to force the valve plate in a direction to seal the discharge opening, and a lever pivoted to the container and having an arm portion extending out of the hollow base to enable manual operation of the lever, said lever being swingable in a plane substantially parallel to the principal plane of the valve plate, another portion of the lever being operatively connected with the valve plate for movement of the latter in a direction to oppose the spring means whereby to move the valve plate into position to permit the contents of the container to be discharged.

2. A dispensing container for foods of granular form, said container having a discharge opening at the bottom, a valve plate movable into two positions, one closing the discharge opening and the other permitting discharge of the food therefrom, spring means bearing on the plate and tending to hold the same in valve closing position, a lever pivoted at one side of the plate and operatively connected therewith at one end, a hollow base for the container adapted to support a receiving receptacle beneath the discharge opening, said hollow base having a slot therein, a resilient arm of said lever extending through the slot and the slot having a shoulder portion which the resilient arm of the lever can engage in order to hold the plate in valve opening position against the force exerted by the aforesaid spring means on the plate.

3. A dispensing container for foods of granular form, said container having a discharge opening at the bottom, a valve plate movable into two positions, one closing the discharge opening and the other permitting discharge of the food therefrom, a compression spring bearing on the plate and tending to hold the same in valve closing position, a lever pivoted at one side of the plate and operatively connected therewith at one end, a hollow base for the container adapted to support a receiving receptacle beneath the discharge opening, an arm of the lever having a spring portion extending out of the base at one side thereof, and a shoulder on the wall of the base positioned to engage the spring portion of said arm to hold the lever in position to maintain the valve open in opposition to the valve closing force exerted by the compression spring.

4. A dispensing container for foods of granular form, said container having a top receiving opening and a relatively restricted bottom discharge opening, a valve plate positioned in sliding relation to the discharge opening, a hollow base for the receptacle in at least partially housing relation to the valve plate, said base having a slot in an upright wall thereof elongated in a plane parallel to the principal plane of the valve plate, and a lever pivoted at one side of the plate and operatively connected thereto at one end, the lever having a resilient arm extending through a slot in the wall of the base, said slot having an inclined portion constituting a rigid shoulder operatively engaged by the resilient arm to retain the lever in a position holding the valve open, said shoulder being released by the arm consequent upon a slight transverse force being imparted to the arm in a direction generally away from the shoulder.

JOSEPH J. GARUBO.